(12) United States Patent
Fukushima et al.

(10) Patent No.: US 8,525,074 B2
(45) Date of Patent: Sep. 3, 2013

(54) MACHINING METHOD AND MACHINING SYSTEM FOR MICROMACHINING A PART IN A MACHINE COMPONENT

(75) Inventors: Takeshi Fukushima, Hekinan (JP); Etuo Yamaoka, Handa (JP); Kouichi Oota, Okazaki (JP); Yukio Yamaguchi, Okazaki (JP); Hiroyuki Ootani, Anjo (JP)

(73) Assignee: Denso Corporation, Kariya (JP)

( * ) Notice: Subject to any disclaimer, the term of this patent is extended or adjusted under 35 U.S.C. 154(b) by 810 days.

(21) Appl. No.: 12/654,439

(22) Filed: Dec. 18, 2009

(65) Prior Publication Data

US 2010/0163539 A1 Jul. 1, 2010

(30) Foreign Application Priority Data

Dec. 26, 2008 (JP) ................................ 2008-335321
Jan. 22, 2009 (JP) ................................ 2009-012296
Aug. 26, 2009 (JP) ................................ 2009-195849

(51) Int. Cl.
*B23K 26/00* (2006.01)

(52) U.S. Cl.
USPC .............................. 219/121.72; 219/121.67

(58) Field of Classification Search
USPC .................................................. 219/121.72
See application file for complete search history.

(56) References Cited

U.S. PATENT DOCUMENTS

| | | | |
|---|---|---|---|
| 6,448,530 B1 | 9/2002 | Fujita et al. | |
| 6,518,543 B1 | 2/2003 | Benz et al. | |
| 7,538,296 B2 * | 5/2009 | Elfizy | 219/121.71 |
| 7,807,943 B2 | 10/2010 | Fukushima | |
| 2006/0027544 A1 | 2/2006 | Pailthorp et al. | |
| 2008/0169275 A1 * | 7/2008 | Koseki et al. | 219/121.75 |
| 2008/0169581 A1 | 7/2008 | Fukushima et al. | |
| 2009/0021731 A1 * | 1/2009 | Denney et al. | 356/318 |

FOREIGN PATENT DOCUMENTS

| | | |
|---|---|---|
| CN | 101142050 A | 3/2008 |
| JP | A-59-015763 | 1/1984 |
| JP | A-10-278279 | 10/1998 |
| JP | A-11-320526 | 11/1999 |
| JP | A-2002-536187 | 10/2002 |
| JP | A-2003-260580 | 9/2003 |
| JP | A-2006-175491 | 7/2006 |
| JP | A-2008-006471 | 1/2008 |
| JP | A-2008-509006 | 3/2008 |
| JP | A-2008-168536 | 7/2008 |
| JP | A-2008-194844 | 8/2008 |
| JP | A-2008-194845 | 8/2008 |
| JP | A-2008-194847 | 8/2008 |

OTHER PUBLICATIONS

Japanese Office Action issued in Application No. 2009-012296; Dated Jan. 4, 2011 (With Translation).
Mar. 27, 2012 Office Action issued in Japanese Patent Application No. 2009-195849 (with translation).
Japanese Office Action issued in Application No. 2009-195849; Dated Jun. 28, 2011 (With Translation).
Sep. 18, 2012 Office Action issued in Chinese Patent Application No. 200910266389.3 (with translation).

* cited by examiner

*Primary Examiner* — Jarrett Stark
*Assistant Examiner* — Lawrence Tynes, Jr.
(74) *Attorney, Agent, or Firm* — Oliff & Berridge, PLC

(57) ABSTRACT

When forming a micromachined part by water jet guided laser machining at a machine component 20, a point for forming a micromachined part is machined while moving a laser head 7 side and machine component 20 side so as to obtain a desired shape of a micromachined part.

8 Claims, 7 Drawing Sheets

MACHINING METHOD AND MACHINING SYSTEM FOR MICROMACHINING A PART IN A MACHINE COMPONENT

BACKGROUND OF THE INVENTION

1. Field of the Invention

The present invention relates to a machining method and machining system for micromachining a part in a machine component.

2. Description of the Related Art

In the past, known drilling and electrodischarge machining have been used for precision machining for forming micro through holes and micro grooves in various machine components.

Drilling requires a drill to be smaller in diameter the smaller the diameter of the hole that it is used for. This raises the drill breakage rate and increases the rate of occurrence of defects in machine components.

Further, electrodischarge machining requires, due to the properties of electromachining, a several dozen to several hundred μm gap (electrodischarge gap) between a machining point and electrode, so the smaller the hole diameter, the finer the electrode that is necessary. Such ultra micro electrodes are incapable of applying a high voltage. Further, the electrodes are not reusable and are extremely expensive, so the running costs rise.

Thus, the assignee focused on a water jet guided laser machining system as a method of machining as an alternative to electrodischarge machining, drilling, and the like (see Japanese Patent Publication (A) No. 2008-6471). That is, a water jet guided laser machining system is a system ejecting high-pressure water from a high-pressure water feed unit as a cylindrical-shaped water column to a machining point and firing a laser beam from a laser generating unit using the water column as a waveguide.

According to such a water jet guided laser machining system, the water column ejected at the machining point has a cylindrical shape. The laser beam progresses while being totally reflected inside the cylindrical water column, so the straightness is high. Accordingly, this enables accurate positioning of the machining point. Further, energy concentrates within the water column, so machining with good efficiency and high precision can be expected.

Water jet guided laser machining has advantages over electrodischarge machining in this respect, but the range of each machining operation is limited to the range of the cross-sectional area of the water column, so formation of any shapes or dimensions of holes or grooves for a machine component requires moving the water jet and laser generating unit or the machine component.

Further, at that time, it is necessary to be careful with the rate of attenuation of the laser power at the machining surface and deep parts. The water jet guided laser machining method uses a thin water jet as a waveguide for the laser beam. The water jet reaches a deep part while impacting walls of an ultrathin span, so the water jet is disturbed at the deep part region and therefore the efficiency drops. That is, it is believed that there is a tendency for the surface roughness to become rougher at the vicinity of a deep part than at the vicinity of the surface of a workpiece.

SUMMARY OF THE INVENTION

The present invention was proposed in view of this background and has as its object to provide a machining method and machining system for micromachining a part at a machine component which enables full use of the water jet guided laser machining method by appropriately moving the machine component and laser beam output side when machining the machine component so as to enable formation of any shape of through hole with a good machining precision.

To solve the above problem, in a first aspect, there is provided a machining method for micromachining a part at a machine component which ejects a high-pressure cylindrical water column at a machining point at the machine component and uses the water column as a waveguide for firing a laser beam for machining so as to form a micromachined part by water jet guided laser machining, which method moves the laser head side outputting a laser beam together with high-pressure water and the machine component side for machining to obtain a desired shape of a micromachined part when applying water jet guided laser machining to a machining point for forming a micromachined part of a machine component.

Due to this, when forming a micromachined part by water jet guided laser machining, a desired shape of a micromachined part corresponding to the machine component can be easily formed.

In a second aspect, the method makes the laser head side move back and forth along the direction of formation of the micromachined part of the machine component while makes the machine component side rock back and forth while machining.

Due to this, a micromachined part is formed more efficiently at a point of the machine component for forming the micromachined part. In such a case, a desired shape of a micromachined part can be formed as intended by changing the movement direction and speed of the laser head side and machine component.

In a third aspect, the method moves the laser head side and the machine component side in a rocking operation direction of the machine component so as to face each other relatively for machining.

Due to this, a micromachined part can be shaped with a much greater efficiency, but a desired shape of a micromachined part can be formed as intended by the method of movement.

In a fourth aspect, the method forms a micromachined part at the machine component by water jet guided laser machining during which it ejects high-pressure water as a cylindrical jet from a high-pressure water feed unit in a vertical direction to the part for formation of the micromachined part and uses the high-pressure cylindrical jet as a waveguide to fire a laser beam from a laser generating unit through a laser head for machining.

Due to this, high-pressure water is ejected as a cylindrical jet from a water high-pressure water feed unit in a vertical direction and the high-pressure cylindrical jet is used as a waveguide for firing a laser beam whereby a beam mark is formed at the point for forming the micromachined part and a groove of a corresponding width is formed.

In a fifth aspect, the method fires a laser beam at the point for forming the micromachined part from the laser head in the vertical direction together with the high-pressure cylindrical jet of high-pressure water, makes the laser head side move back and forth along the direction of formation of the micromachined part of the machine component, and makes a machining table supporting the machine component rock back and forth by a predetermined angle about the vertical axis.

Due to this, by the machine component is made to rock back and forth about the vertical axis at the point at the machine component for forming the micromachined part, whereby a micro groove is formed which opens in a cross-sectional fan shape.

In a sixth aspect, the micromachined part of the machine component has a fan shape.

Due to this, by making the laser head side and the machine component side move, the beam strikes the machining point for forming the micromachined part in a fan shape and, as a result, the machining point is formed into a micro groove having the desired cross-sectional fan shape.

In a seventh aspect, the micromachined part of the machine component is a circular hole with a predetermined diameter and the laser beam output from the laser head together with the high-pressure water moves along the surface of formation of the micromachined part at the machine component.

Due to this, a circular hole of a desired diameter can be formed with a high precision.

In an eighth aspect, the machine component is an injector and the micromachined part is an ejection hole.

Due to this, it is possible to produce an injector having injection holes formed in high precision.

In a ninth aspect, there is provided a machining system for micromachining a part at a machine component at the machine component for forming a micromachined part by water jet guide laser machining, the system provided with a water jet guided laser machining system provided with a laser head ejecting high-pressure water as a cylindrical water column and outputting a laser beam and a machining table for carrying a machine component for machining, the laser head provided with a laser head drive mechanism, the machining table provided with a rocking drive mechanism, and the laser head operated by the laser head drive mechanism while making the machining table rock by the rocking drive mechanism to fire a laser beam together with the high-pressure water at the machining point of the machine component for forming the micromachined part for machining so as to obtain a desired shape of the micromachined part.

Due to this, by making the laser head operate by the laser head drive mechanism while making the machining table carrying the machine component rock back and forth by the rocking drive mechanism, a water column is ejected and a laser beam is fired at the machining point for formation of the micromachined part, a beam mark is formed, and the machining point for forming the micromachined part is formed into a desired shape of a micromachined part.

In a tenth aspect, the machine component is an injector, and the micromachined part is an ejection hole.

Due to this, it is possible to produce an injector having injection holes formed in high precision.

Further, in an eleventh aspect, there is provided a machining method for micromachining a part at a machine component which ejects a high-pressure cylindrical water column at a machining point at the machine component and uses the water column as a waveguide for firing a laser beam for machining so as to form a micromachined part by water jet guided laser machining, which method moves the machine component side for machining to when applying water jet guided laser machining to a machining point of a machine component for forming a micromachined part.

Due to this, by making the machine component side to the machining point at the machine component for forming the micromachined part, a laser beam is fired within the range of operation of the machine component, whereby a shape of the micromachined part defined by the range of operation is formed.

Summarizing the advantageous effects of the invention, by making the machine component side and the laser firing side move when forming a micromachined part at a machine component, it is possible to form any shape of micromachined part by the way the machine component side or the laser output side is moved even in the water jet guided laser machining method where the range of machining in each machining operation is limited to the range of cross-sectional area of the water column.

When the machine component is an injector, it is possible to produce an injector having injection holes formed in high precision.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
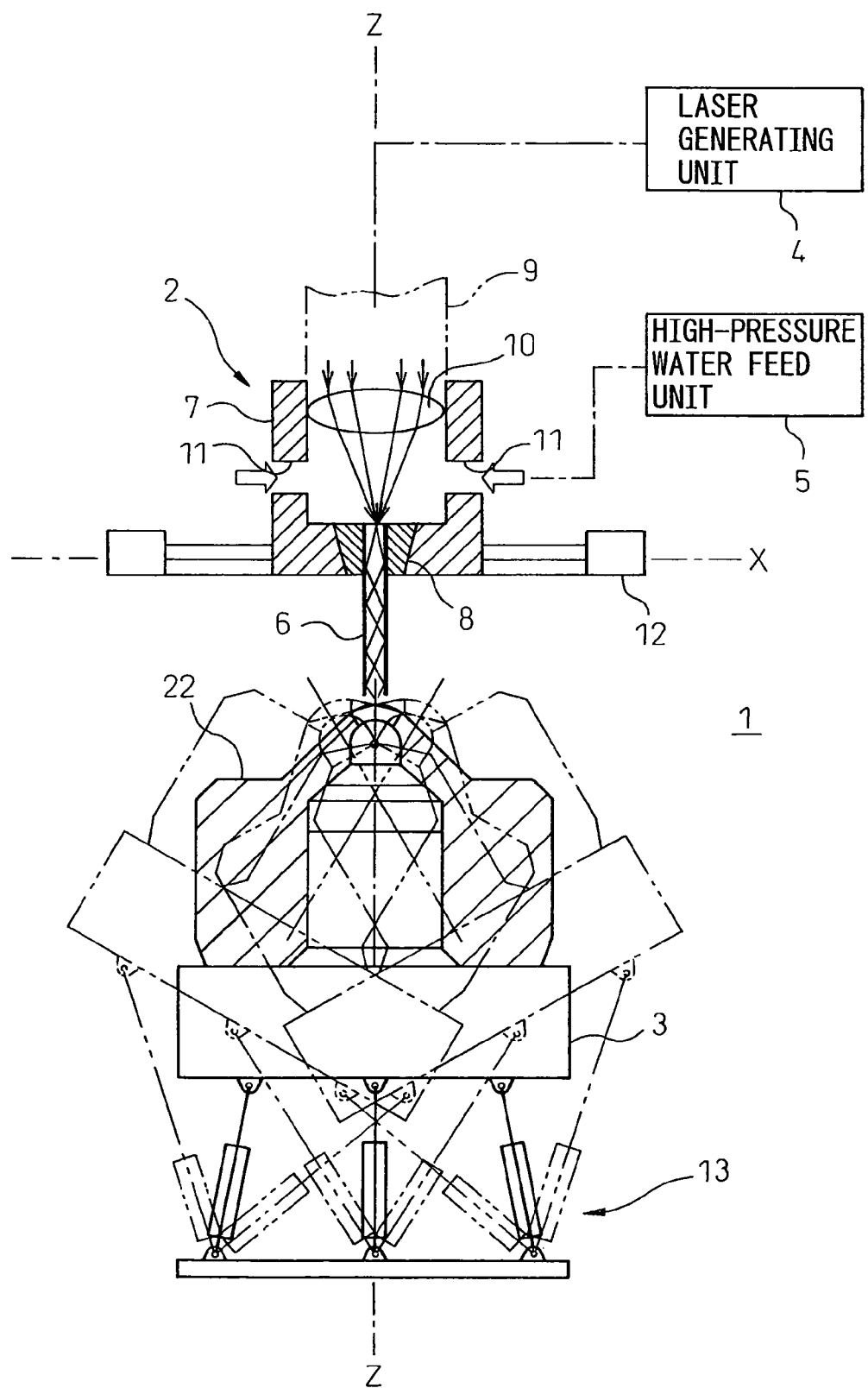
FIG. 1 is a schematic view of the configuration showing an example of a machining system working the machining method for micromachining a part at a machine component according to the present invention.

An example of a machining system 1 used when working a machining method for micromachining a part in a machine component according to the present invention is shown.

The present machining system 1 is a system for forming a micromachined part by water jet guided laser machining of a machine component (to be mentioned later).

The present machining system 1 will be described in more detail later, but is provided with a water jet guided laser machining system 2 using a water jet as a waveguide of a laser and a machining table 3 for carrying the machine component for machining.

The water jet guided laser machining system 2 is provided with a laser generating unit 4 generating a laser beam, a high-pressure water feed unit 5 generating high-pressure water, a laser head 7 ejecting high-pressure water from the high-pressure water feed unit 5 as a water column 6 and firing a laser beam, and a nozzle 8 enabling the high-pressure water to be ejected from the laser head 7 as a cylindrical water column 6 with a predetermined fine diameter. It uses the water column 6 of the high-pressure water ejected through the nozzle 8 as a waveguide for firing the laser beam focused at the laser head 7.

The laser head 7 is coupled to the laser generating unit 4 through an optical fiber 9. The laser head 7 is provided with an interposed focusing lens and an introduction port 11 for introducing high-pressure water from the high-pressure water feed unit 5.

Further, in a machining system 1 having such a configuration, while details are not shown, the laser head 7 in the water jet guided laser machining system 2 is provided with a laser head drive mechanism 12 for moving the laser head 7 so that the water column proceeds along the contours of the micromachined part, while the machining table 3 is provided with a rocking drive mechanism 13 for making the machining table 3 rock about the axis passing through the center of the micromachined part in vertical direction.

It is sufficient for the laser head drive mechanism 12 for moving the laser head 7 to be a known drive mechanism comprised of for example an XY stage and controllable by a control console (not shown).

Further, the rocking drive mechanism 13 making the machining table 3 rock can for example be comprised of multiaxial link swivel mechanisms carrying extension drive mechanisms. This rocking drive mechanism 13 is also configured to be controllable by a control console (not shown).

An operation program which links the laser head drive mechanism 12 and rocking drive mechanism 13 in operation to micromachine a part of the machine component to the desired dimensions and shape is stored at the control console.

Figure 2:
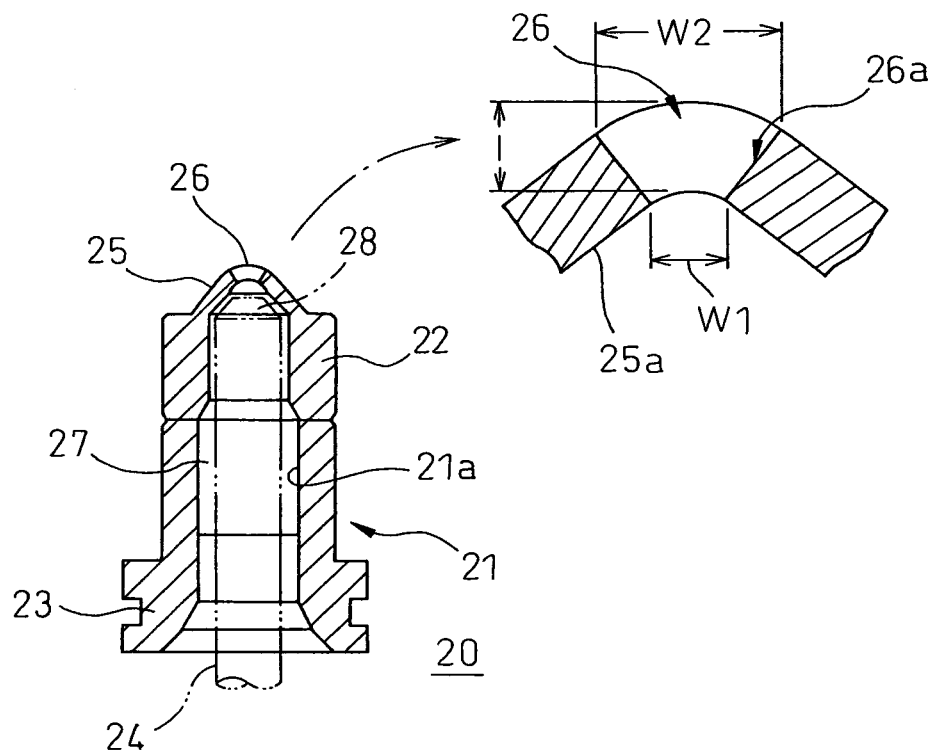
FIG. 2 is a cross-sectional view of major parts showing an example of an injector as a machine component provided with a workpiece.

Here, as shown in FIG. 2, an injector can be mentioned as an example of a machine component 20.

The machine component 20 (hereinafter the injector 20) will not be explained in detail, but comprises a cylindrical nozzle body 21 on the fuel injection tip side, a cap 22 as the workpiece able to be fit on the tip of the nozzle body 21, and a mount 23 mounting the injector body (not shown) to the back end side.

The nozzle body 21 extends in the axial direction in a lateral circular cross-sectional shape and has a hollow part 21a through which a needle-shaped needle valve 24 is inserted to be movable in the axial direction.

Further, the cap 22, as shown in the drawing, has a roughly conical-shaped dome 25 having a space at the inside at the tip side. At the inside space of the dome 25, a truncated cone-shaped valve seat 25a is formed.

Figure 3:
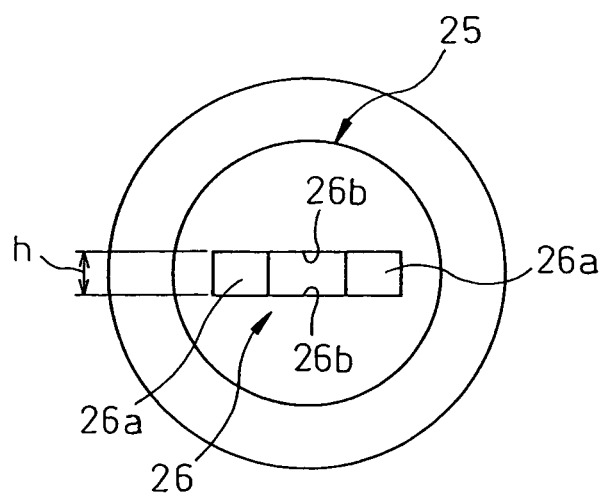
FIG. 3 is a plan view of the injector shown in FIG. 2 seen from above.

Further, at the tip of the dome 25, a variant injection hole 26 is formed passing through the dome 25 in the thickness direction to a length l. The injection hole 26 is partitioned, as shown in FIG. 3, by a left-right symmetrical pair of side walls 26a and transverse walls 26b. The short width h of the irregular diameter injection hole 26 is constant over the entire length.

As opposed to this, the long width, as shown in FIG. 2, increases from w1 at the inner circumference side to w2 at the outer circumference side. The variant injection hole 26 has a fan-shaped longitudinal cross-sectional shape. Therefore, the symmetrical side walls 26a have a long rectangular shape, while the transverse walls 26b have a fan shape.

The needle valve 24 has an outside diameter smaller than the inside diameter of the guide hole 21a of the nozzle body 21, so a ring-shaped fuel circulation path 27 is formed between them. Further, the needle valve 24 has, at its tip, a valve element 28 seated on a valve seat 25a in the inner space of the dome 25. The needle valve 24 is moved back and forth (up and down in FIG. 1) in the axial direction. When moved up, the valve element 28 separates from the valve seat 25a and opens the variant injection hole 26. As a result, the fuel in the fuel circulation path 27 is sprayed with a fan-shaped spray distribution profile from the variant injection hole 26.

Next, a machining procedure using the machining system 1 will be explained for a micromachining a part in the cap 22, that is, the variant injection hole 26 of the tip of the nozzle body 21 of the injector 20.

First, the workpiece, that is, the cap 22, is held on the machining table 3. In this case, initially the machining table 3, that is, the top surface carrying the workpiece, that is, the cap 22, is roughly horizontal. The cap 22 is placed on the carrying surface, where the cap 22 is struck by a laser beam from the laser generating unit 4 and a water column 6 from the high-pressure water feed unit 5 in the water jet guided laser machining system 2 from the vertical direction.

Next, if an operation command is given to the control console in the machining system 1, the laser head 7 in the water jet guided laser machining system 2 is sent high-pressure water from the high-pressure water feed unit 5. The laser head 7 ejects the high-pressure water through the nozzle 8 as a cylindrical water column 6 with a predetermined fine diameter. On the other hand, the laser beam generated at the laser generating unit 4 is sent through the optical fiber 9 to the laser head 7 and focused to a desired diameter by the focusing lens at the laser head 7. The laser beam focused at the laser head 7 can be fired using the water column 6 of the high-pressure water ejected through the nozzle 8 as a waveguide.

Due to this, the laser beam from the laser generating unit 4 and the water column 6 from the high-pressure water feed unit 5 of the water jet guided laser machining system 2 strike the point to be formed into the micromachined part, that is, the variant injection hole 26, as a water column 6 from the vertical axis direction. The laser beam output from the laser generating unit 4 proceeds by total reflection along the water column 6 and is fired together with the water column 6 at the point to be formed into the variant injection hole 26 with no leakage.

The cross-sectional area of the water column 6 is far smaller than the area of the variant injection hole 26, so to obtain the desired shape of the variant injection hole 26, an operation is carried out that links the laser head drive mechanism 12 driving the laser head 7 and the rocking drive mechanism 13 rocking the machining table 3 with a program stored in advance in the control console.

Figure 4:
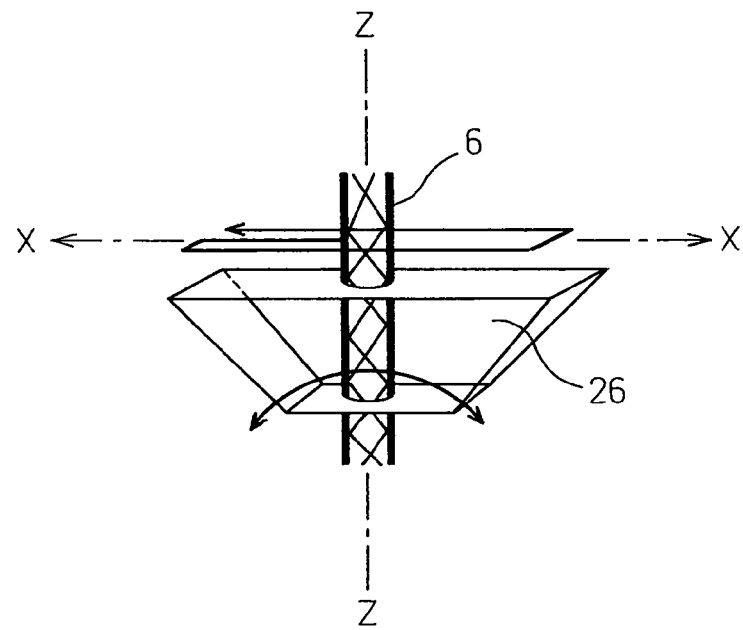
FIG. 4 is a schematic perspective view for explaining the machining procedure for micromachining a part at a machine component according to the present invention.
Figure 5:
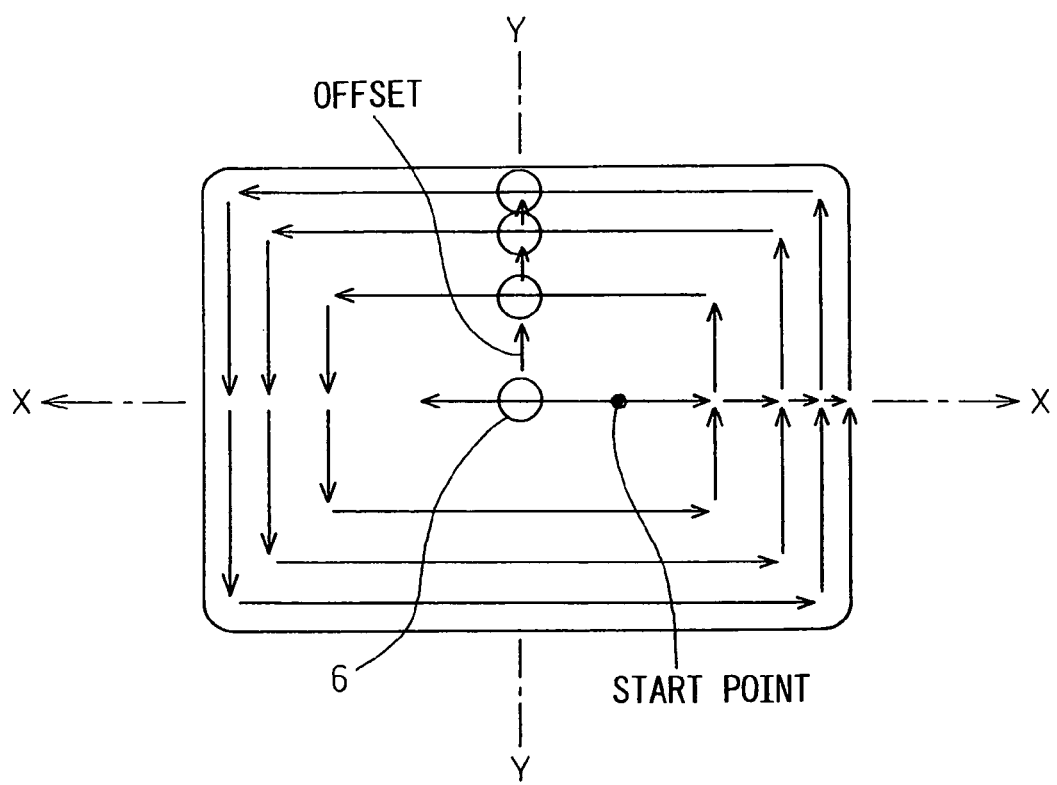
FIG. 5 is a diagram showing the path of a machining operation by a laser head in the machining procedure for micromachining a part in a machine component according to the present invention.

For example, as shown in FIG. 4 and FIG. 5, the laser head 7 side initially starts the machining at an appropriate position of the cap 22 on the X-axis as a start point by making the laser beam from the laser generating unit 4 and the water column 6 from the high-pressure water feed unit 5 strike the cap from the vertical axis direction as the water column 6.

The laser head 7 is moved by the laser head drive mechanism 12 back and forth in the X-direction in the drawing, that is, the length direction of the variant injection hole 26. Due to this, the laser beam and the water column 6 strike the hole wall surface in parallel which gradually cut away the hole wall surface. Further, the laser head drive mechanism 12 can be made to gradually move (be offset) by a micro distance in the Y-direction with each back and forth movement in the X-direction, while the machining table 3 side can be made to rock at a constant speed by the rocking drive mechanism 13 by a predetermined angle about the vertical axis Z.

In the above way, the part of the workpiece, that is, the cap 22, where the variant injection hole 26 is to be formed is struck by the laser beam along with the water column 6, as shown in FIG. 5, from the start point of the machining table 3 at the left and right based on the rocking operation of the machining table 3 whereby the desired variant injection hole 26 is formed (see FIG. 4).

Above, an example of a machining method for micromachining a part in a machine component according to the present invention was given for the explanation. However, in the machining method for micromachining a part in a machine component using water jet guided laser machining, when making both the laser head 7 side and the machining table 3 side supporting the machine component move, it is possible to further improve the machining efficiency by making the laser head 7 side and the machine component 20 side move in the rocking operation direction of the machine component 20 so as to face each other relatively for the machining.

For example, if explained using FIG. 5, when using the laser head drive mechanism 12 to make the laser head 7 move to the left along the X-axis direction, the machining table 3 supporting the machine component 20 is swung by the rocking drive mechanism 13 along the X-axis direction to the right.

On the other hand, when making the laser head 7 move to the right along the X-axis direction, the machining table 3 supporting the machine component 20 is swung by the rocking drive mechanism 13 along the X-axis direction to the left.

By using a program stored in advance in the control console to move the laser head 7 and the machining table 3 by the laser head drive mechanism 12 and the rocking drive mechanism 13 so as to face each other relatively, the speed of movement of the firing point of the laser beam at the machine component 20 is multiplied and the progress of the machining can be accelerated.

Figure 6:
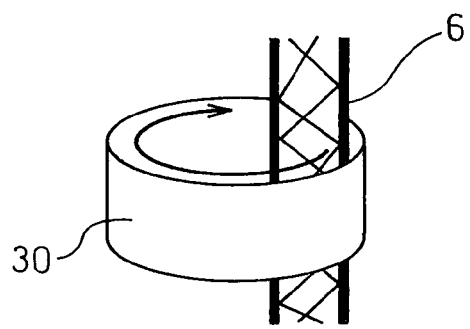
FIG. 6 is a schematic perspective view of a machining procedure for machining a circular hole as a micromachined part using the machining method of the present invention.

Further, in the present invention, if using the method of using the water jet guided laser machining system to make the laser head 7 side and the machining table 3 side supporting the machine component 20 move, any diameter of circular hole 30 can be formed (see FIG. 6).

In this case, any diameter of circular hole 30 can be formed by making the operation mechanism (not shown) of the laser head 7 revolve so that the high-pressure cylindrical jet from the high-pressure water feed unit 5 traces the contour of the circular hole 30 as the micromachined part.

Of course, a circular hole can also be formed by making not the laser head 7 side, but the operation mechanism of the machining table 3 side supporting the machine component 20 move so as to eject the water column 6 from the laser head 7 so as to trace the contour of the circular hole 30.

In addition to the above machining methods for micromachining a part in the machine component laid out above, a method of anchoring the laser head 7 side and making the machining table 3 side supporting the machine component rock is also possible as in Reference Example 1 described below.

REFERENCE EXAMPLE 1

Here, when forming a micro groove at a machined point (to be mentioned later) of a machine component, the machine component is made to rock during the machining when applying laser machining to the machined point for forming the micro groove. The machining system 40 in this case is provided with a laser machining system 41 substantially the same as the water jet guided laser machining system 2 in the machining system 1 shown in FIG. 1 and is provided with a rockable machining table 3. Note that, in the laser machining system 41, parts the same as the water jet guided laser machining system 2 are assigned the same notations and their explanations are omitted.

Figure 7:
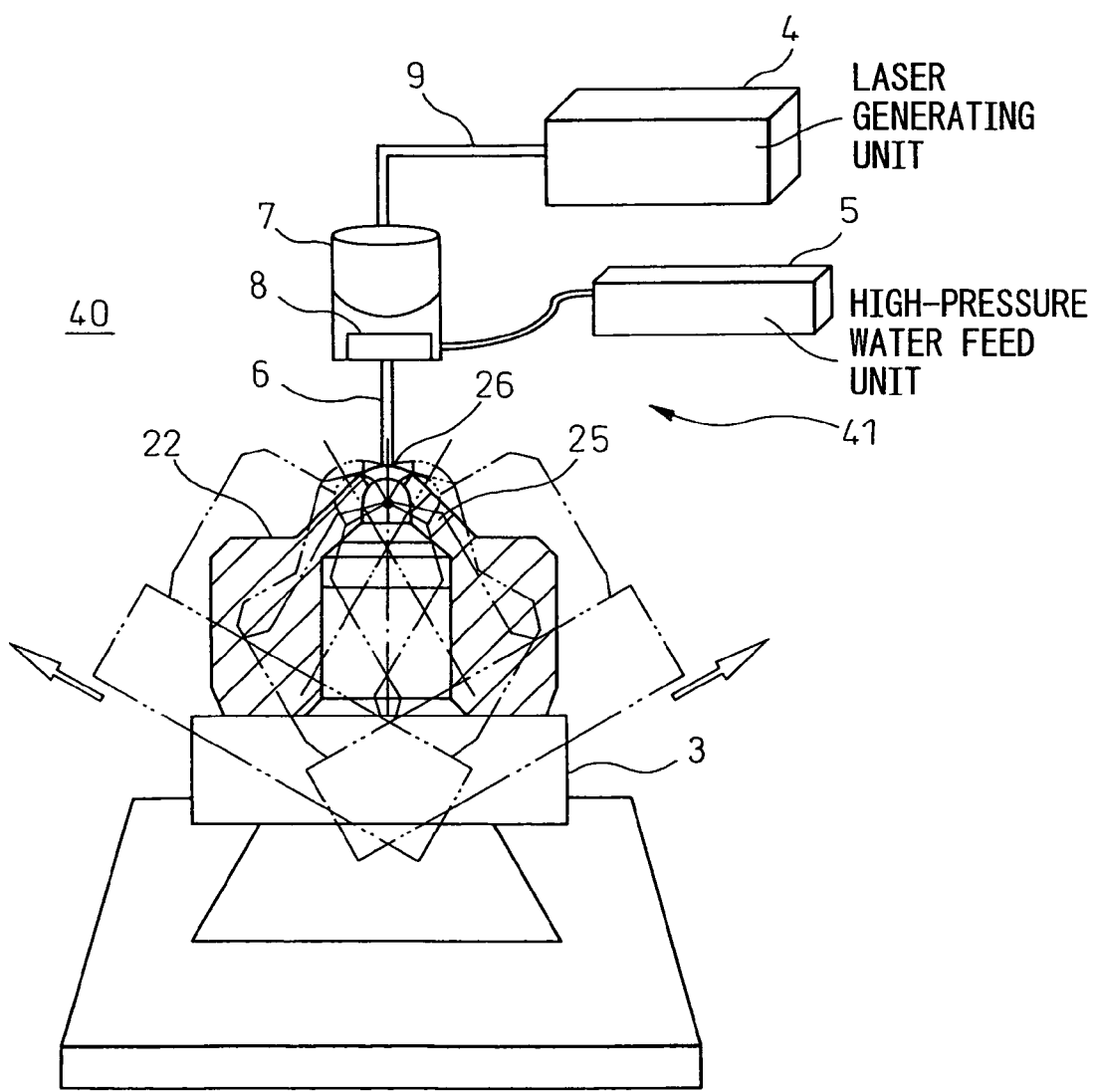
FIG. 7 is a schematic view of the configuration showing a first reference example of a machining system working a different machining method.

As shown in FIG. 7, in this laser machining system 41, the laser head 7 is not provided with a laser head drive mechanism 12 and is fixed in place.

In machining by such a laser machining system 41 of the machining system 40, water is ejected to form a water column 6 on a cap 22 of an injector 22 rockably held by a machining table 3 and a laser beam is fired through the inside of the water column 6.

Note that as the injector 20 to be machined, the injector 20 shown in FIG. 2 is envisioned as an example. Drawings and explanations for this are omitted to avoid redundant drawings and explanations.

Next, a machining procedure using the laser machining system 41 of the machining system 40 to form a micro groove, that is, a variant injection hole 26, in the cap 22 at the tip of the nozzle body 21 of the injector 20 will be explained.

First, the cap 22 of the injector 20 is held on the machining table 3. In this case, initially the machining table 3, that is, the top surface carrying the workpiece, that is, the cap 22, is roughly horizontal. If the cap 22 is placed on the carrying surface, the center axis of the cap 22 matches the vertical axis and matches the laser beam from the laser generating unit 4 and the water column 6 from the high-pressure water feed unit 5 of the laser machining system 41 (neutral state).

Next, an operation command is given by a control console in the machining system 40 to the machining table 3, the high-pressure water feed unit 5, and the laser generating unit 4, whereby water is ejected to form the water column 6 at the point for forming the variant injection hole 26 of the cap 22 and the laser beam is fired through the inside of the water column 6.

Due to this, high-pressure water for the water column 6 runs from the high-pressure water feed unit 5 through the nozzle 8 and strikes the point for forming the variant injection hole 26 of the cap 22 from the vertical axis direction as a water column 6.

On the other hand, the laser beam output from the laser generating unit 4 is guided from the laser generating unit 4 through an optical fiber to the laser head 3 where it is focused to the desired diameter, then is guided along the water column 6 together with the water column 6 to the point of the cap 22 for forming the variant injection hole 26.

Here, the machining table 3 is rocked at a constant speed by a not shown drive mechanism so as to swing by a predetermined angle about the vertical axis.

Figure 8:
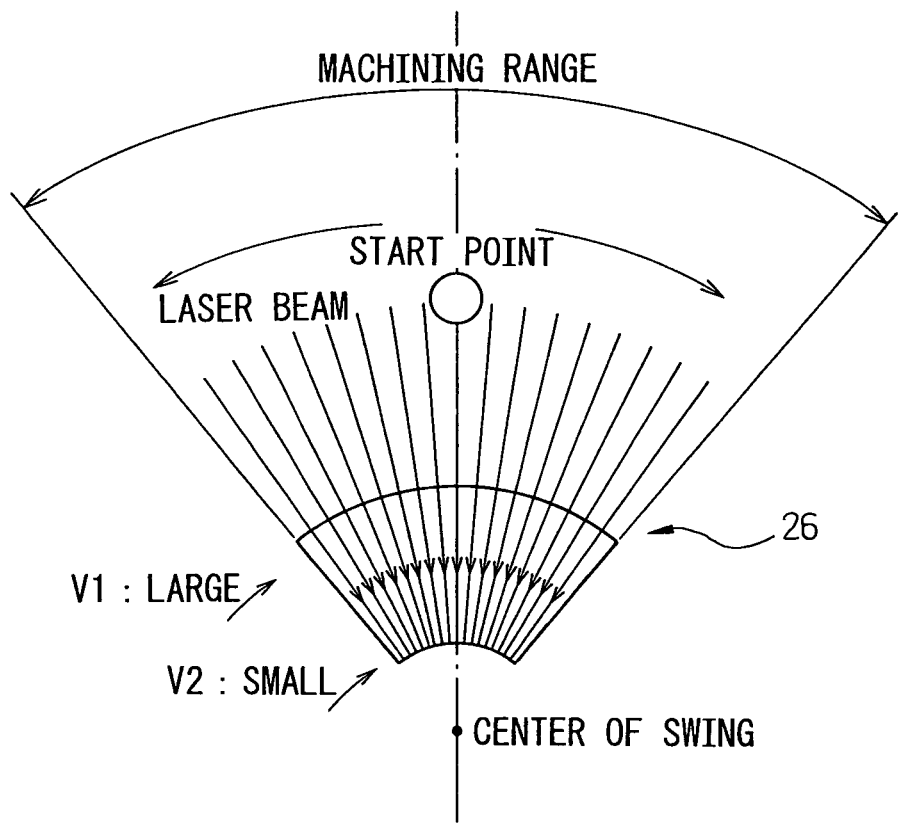
FIG. 8 is a diagram showing a range of firing a laser beam forming a machining range for machining by the machining system shown in FIG. 7.

Due to this, the point of the cap 22 for forming the variant injection hole 26 is struck and fired upon by the water column 6 and the laser beam, as shown in FIG. 8, from the start point at the neutral state of the machining table 3 to the left and right based on the rocking operation of the machining table 3, whereby the desired variant injection hole 26 is formed.

In this regard, if the laser beam is fired at the point of the cap 22 for forming the variant injection hole 26 together with the water column 6 when the machining table 3 is rocking as in the above, even if the power of the laser beam is an appropriate input value, the actual power in machining will be less at a deep part than at the surface, so the roughness near a deep part will tend to worsen.

However, by performing the above rocking machining, the speed of movement V2 of the firing point of the laser beam will drop near a deep part in comparison to the speed of movement V1 of the firing point of the laser beam near the surface, so even if the power of the laser beam drops, the degree of machining can be maintained at a predetermined level (see FIG. 8).

In other words, near a deep part, the firing points of the laser beam will concentrate in a narrower range and overlap. This will lead to an improvement in degree of finish of the machined surface.

Figure 9:
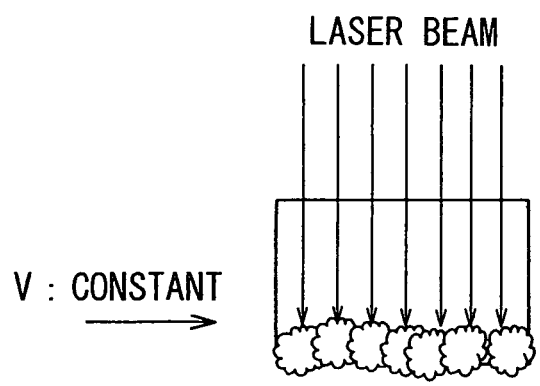
FIG. 9 is a diagram showing a range of firing a laser beam forming a machining range when making the machining point move at a constant speed.
Figure 10:
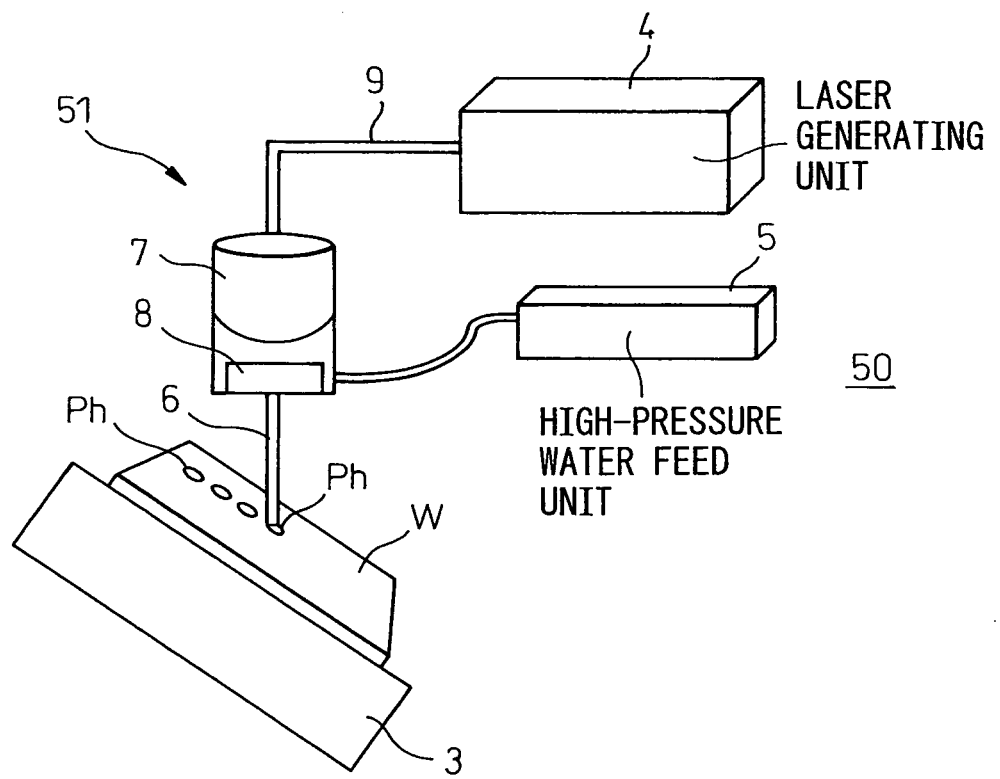
FIG. 10 is a schematic view of the configuration of a machining system according to a second reference example using a water jet guided laser machining system.

On the other hand, in machining without such rocking, as shown in FIG. 9, it will be easily understood that near a deep part, regardless of the attenuation of laser power, the speed of movement V of the firing point of the laser beam is the same as at the surface side, so the machining ability is insufficient and the surface roughness unavoidably deteriorates.

Above, an example of using a water jet guided laser machining system to form a variant micromachined part on a machine component was shown, but the water jet guided laser machining system, of course, can also be used to form a micro hole. Below, this will be explained as Reference Example 2.

REFERENCE EXAMPLE 2

Here, while explained later, a machining method combining formation of a pilot hole (by water jet guided laser machining) and finishing (by drilling etc.) is employed. However, at the stage where water jet guided laser machining using a water jet guided laser machining system is improved in precision, it should be possible to form high precision micro holes by just water jet guided laser machining.

The water jet guided laser machining system 51 (hereinafter referred to as a "laser machining system 51") in such a machining system 50 is used, when forming a micro hole in a workpiece (explained later) of a machine component, to form a pilot hole for guiding the direction of formation at the point of the workpiece W, held in a slanted state on a machining table 3, for forming the micro hole 52.

The laser machining system 51 in this case has the same configuration as the laser machining system 41 shown in Reference Example 1. The same notations are assigned to the parts and detailed explanations are omitted.

In formation of the pilot hole by such a laser machining system 51, water is ejected to form a water column 6 and a laser beam is fired through the inside of the water column 6 at the point of the workpiece W, held in a slanted state on a machining table 3, for forming the micro hole 52.

Figure 11:
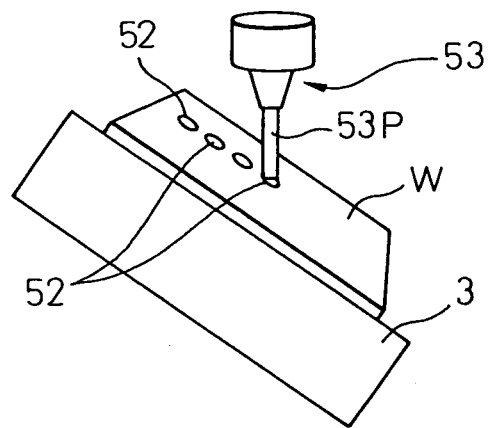
FIG. 11 is a schematic view for explaining machining applying drilling as finishing work on a workpiece machined by the machining system shown in FIG. 10.

After forming the pilot hole by the laser machining system 51, the hole is drilled using a drill 53 as finishing machining (see FIG. 11).

Figure 12:
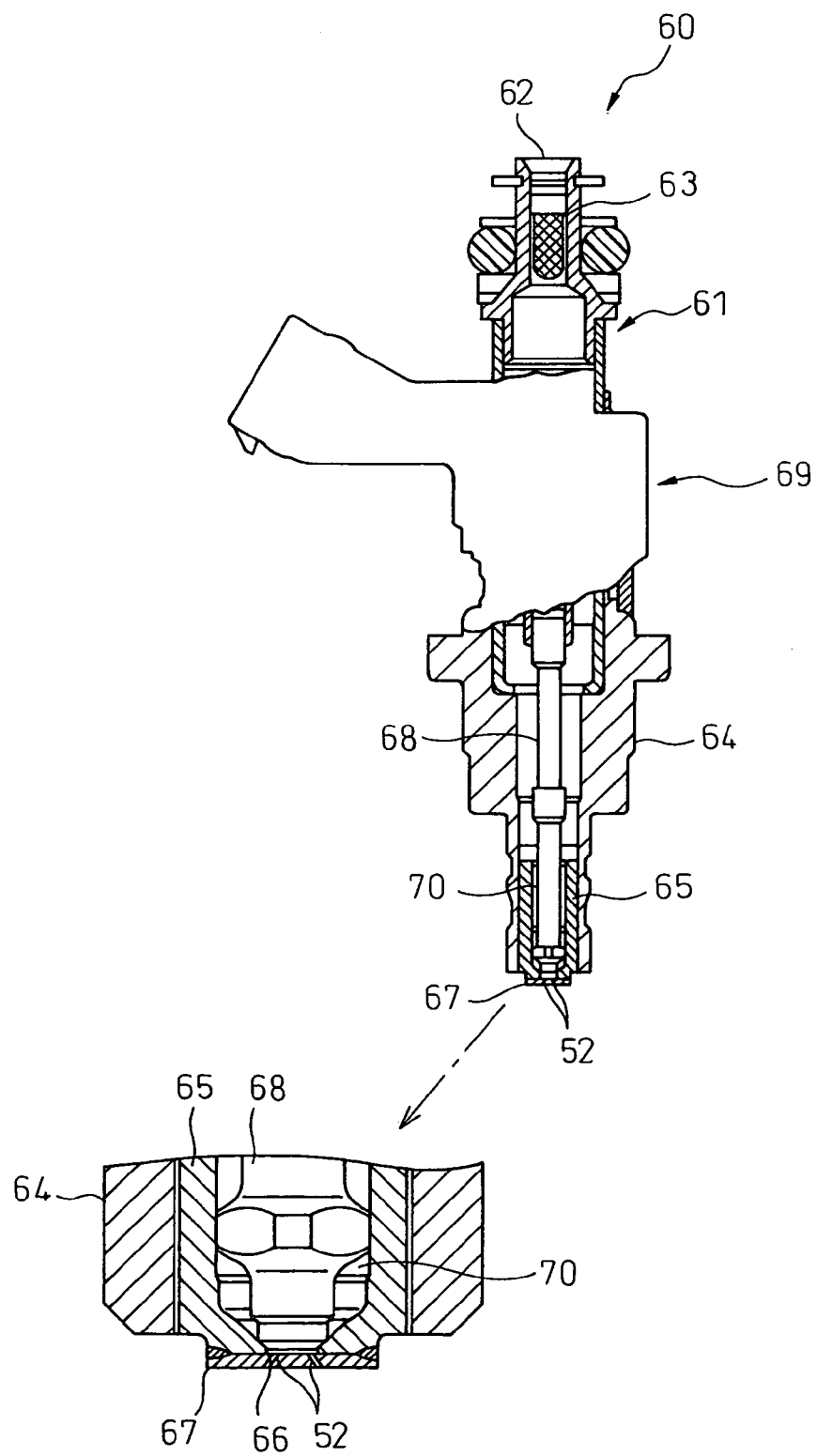
FIG. 12 is a cross-sectional view showing an example of an injector as a machine component provided with a workpiece.

As a machine component provided with a workpiece W, as shown in FIG. 12, an injector 60 can be mentioned as an example.

The injector 60 has a tube-shaped housing 61 not explained in the detail. The top end of the housing 61 forms a fuel inlet 62. The fuel inlet 62 is fed with fuel from a not shown fuel pump. The fuel flows through a fuel filter 63 to the inner circumference side of the housing 61.

The bottom end of the housing 61 is provided with a nozzle holder 64. Inside, a tube-shaped valve body 65 is formed. The valve body 65 has an opening 66 at the end opposite from the fuel inlet 62 in the axial direction. In this opening 66, the workpiece W, that is, the injection hole plate 67, is fixed. The injection hole plate 67 is provided with micro holes 52 (hereinafter referred to as "injection holes 52") formed at a slant so as to become wider at the outer side. Note that, a needle 68 is contained in the inner circumference side of such a housing 61, nozzle holder 64, and valve body 65 so as to be capable of reciprocal movement. The needle 68 is configured to move up and down in the axial direction by an electromagnetic drive means, that is, a drive unit 69, to form a fuel path 70 with the valve body 65 through which the fuel flows, feed fuel to the injection holes 52 of the injection hole plate 67 in the opening 66, and eject fuel to the outside through the injection holes 52.

Further, the workpiece W, that is, the injection hole plate 67, is formed into a thin plate shape. The injection hole plate 67 is provided with a plurality of micro holes, that is, injection holes 52, formed slanted, around the center of the injection hole plate 67 so as to mimic the roughly circular opening 66 at the end of the injection hole plate 67 side of the valve body 65.

Next, the machining procedure for forming the injection holes 52 as micro holes in the workpiece W, that is, the injection hole plate 67 of the injector 60, will be explained.

First, the workpiece W, that is, the injection hole plate 67, is held in a slanted state on the machining table 3. In this case, the slanted holding angle of the injection hole plate 67 to the machining table 3 is matched with the slant angle of the injection hole 52 to be formed.

Next, an operation command is given by a control console in the machining system 51 to the high-pressure water feed unit 5 and the laser generating unit 4, whereby water is ejected to form the water column 6 and a laser beam is fired through the inside of the water column 6 at a point of the workpiece W for forming a micro hole W.

Due to this, the high-pressure water for the water column 6 from the high-pressure water feed unit 5 passes through the nozzle 8 and strikes the point of the workpiece W for forming the micro hole as a water column 6 with a slanted holding angle.

On the other hand, the laser beam output from the laser generating unit 4 is guided from the laser generating unit 4 through an optical fiber 9 to the laser head 7 where it is focused to the desired diameter, then is guided along the water column 6 together with the water column 6 to the point of the workpiece W for forming the micro hole.

Due to this, a pilot hole oriented at the slanted holding angle of the injection hole plate 67, that is, the slanted angle of the injection hole 52, is formed at the point of the workpiece W for forming the micro hole.

By repeating formation of the pilot holes, a desired number of pilot holes Ph can be formed in the workpiece W.

Further, after the above such pilot holes Ph are formed in the workpiece W, the holes are drilled as finishing work in a state held at the same slanted angle on the machining table 3 (see FIG. 11).

A drill 53 is fit with a drill bit 53$p$ of a size corresponding to the injection hole 52. The drill bit 53$p$ is made to proceed toward the pilot hole Ph in the workpiece W for drilling along the same machining direction as the water column 6 and laser beam in the laser machining system 1.

In this case, the drill bit 53$p$ is a ultra fine one corresponding to the micro diameter of the injection hole 52. The drill bit 53$p$ can proceed along the pilot hole Ph oriented to the slanted angle of the injection hole 52 with the pilot hole Ph as a guide, so stress on the drill bit 53$p$ can be suppressed as much as possible. Therefore, drilling can be reliably carried out without the drill bit 53$p$ breaking.

Further, for forming the pilot hole, other than using a water jet guided laser machining system, normal laser machining may also be used. However, using a water jet guided laser machining system is more advantageous and efficient in that when carrying out finishing work, that is, drilling, it reduces the amount of work in the drilling (amount of removal) to the minimum.

Further, for the finishing work, electrodischarge machining is also possible.

Further, the above such water jet guided laser machining system can be expected to be improved in precision in the future. When it has achieved the desired level of precision, formation of high precision micro holes from formation of the pilot holes to the finishing work can be expected from a water jet guided laser machining system alone.

When working the machining method for micromachining a part at a machine component according to the present invention, an injector was illustrated as the machine component and the machining procedure for forming a micro groove, that is, a variant injection hole, in a cap was explained. However, the machine component, of course, is not limited to an injector and may be a variety of other machine components having microgrooves such as carburetor vents, liquid flow control orifices, and printing machine injection nozzles.

While the invention has been described with reference to specific embodiments chosen for purpose of illustration, it should be apparent that numerous modifications could be made thereto by those skilled in the art without departing from the basic concept and scope of the invention.

The invention claimed is:

1. A machining method for micromachining a part at a machine component by water jet guided laser machining, which method moves the laser head outputting a laser beam together with high-pressure water and the machine component for machining to obtain a hole of the micromachined part having a fan-shaped longitudinal cross-sectional shape or a circular shape when applying water jet guided laser machining to a machining point for forming the micromachined part of the machine component, and which method starts said water jet guided laser machining at a start point being more inner than the outermost circumference position of said hole, and after the start of said water jet guided laser machining, moves the laser head or the machine component back and forth in a predetermined direction at the inner more side than the outermost circumference position of the hole and then, machines the outer circumference side of the hole.

2. A machining method for micromachining a part of a machine component as set forth in claim 1, which makes the laser head side move back and forth along the direction of formation of the micromachined part of the machine component while makes the machine component side rock back and forth while machining.

3. A machining method for micromachining a part of a machine component as set forth in claim 2, which moves the laser head side and the machine component side in a rocking operation direction of the machine component so as to face each other relatively for machining.

4. A machining method for micromachining a part of a machine component as set forth in claim 1, which forms a micromachined part at the machine component by water jet guided laser machining during which it ejects high-pressure water as a cylindrical jet from a high-pressure water feed unit in a vertical direction to the part for formation of the micromachined part and uses the high-pressure cylindrical jet as a waveguide to fire a laser beam from a laser generating unit through a laser head for machining.

5. A machining method for micromachining a part of a machine component as set forth in claim 1, which fires a laser beam at the point for forming the micromachined part from the laser head in the vertical direction together with the high-pressure cylindrical jet of high-pressure water, makes the laser head side move back and forth along the direction of formation of the micromachined part of the machine component, and makes a machining table supporting the machine component rock back and forth by a predetermined angle about the vertical axis.

6. A machining method for micromachining a part of a machine component as set forth in claim 1, wherein the micromachined part of the machine component has a fan shape.

7. A machining method for micromachining a part of a machine component as set forth in claim 1, wherein the micromachined part of the machine component is a circular hole with a predetermined diameter and the laser beam output from the laser head together with the high-pressure water moves along the surface of formation of the micromachined part at the machine component.

8. A machining method for micromachining a part of a machine component as set forth in claim 1, wherein the machine component is an injector and the micromachined part is an ejection hole.

* * * * *